(12) United States Patent
Gu et al.

(10) Patent No.: US 8,505,189 B2
(45) Date of Patent: Aug. 13, 2013

(54) APPARATUS FOR MANUFACTURING BACKLIGHT SOURCE

(75) Inventors: Gang-Tao Gu, Shenzhen (CN);
Zhong-Hai Xiao, Shenzhen (CN);
Min-Cheng Wang, Miao-Li County (TW)

(73) Assignees: Innocom Technology (Shenzhen) Co., Ltd., Shenzhen, Guangdong Province (CN); Chimei InnoLux Corporation, Miaoli County (TW)

( * ) Notice: Subject to any disclaimer, the term of this patent is extended or adjusted under 35 U.S.C. 154(b) by 73 days.

(21) Appl. No.: 13/032,656

(22) Filed: Feb. 23, 2011

(65) Prior Publication Data
US 2011/0252630 A1 Oct. 20, 2011

(51) Int. Cl.
*B23P 23/00* (2006.01)
(52) U.S. Cl.
USPC ............... 29/564.1; 29/564; 29/729; 29/739; 29/741; 29/742
(58) Field of Classification Search
USPC ................ 29/729, 739, 741, 742, 564, 564.1
See application file for complete search history.

(56) References Cited

U.S. PATENT DOCUMENTS

| | | | | | |
|---|---|---|---|---|---|
| 4,774,759 | A | * | 10/1988 | Makoto et al. | 29/741 |
| 4,794,689 | A | * | 1/1989 | Seno et al. | 29/740 |
| 4,969,256 | A | * | 11/1990 | Shimizu et al. | 29/834 |
| 6,708,402 | B2 | * | 3/2004 | Hirano et al. | 29/833 |

FOREIGN PATENT DOCUMENTS
JP  07-115298  *  5/1995

* cited by examiner

*Primary Examiner* — Carl Arbes
(74) *Attorney, Agent, or Firm* — Li & Cai Intellectual Property (USA) Office (57) ABSTRACT

A manufacturing apparatus for a backlight unit includes a feed mechanism, a testing mechanism, and an attachment mechanism. The feed mechanism arranges a plurality of light-emitting diodes in a row. The testing mechanism tests the light-emitting diodes. The attachment mechanism positions the light-emitting diodes to a circuit board. The attachment mechanism comprises a support assembly and a laminating device, in which the support assembly receives the light-emitting diodes tested by the at least one testing unit, the support assembly is opposite to the circuit board, and the laminating device laminates the light-emitting diodes to the circuit board. A method for manufacturing the backlight unit is also provided.

9 Claims, 9 Drawing Sheets

FIG. 9

APPARATUS FOR MANUFACTURING BACKLIGHT SOURCE

BACKGROUND

1. Technical Field

The present disclosure relates generally to backlighting and, more particularly, to a method and an apparatus for manufacturing a backlight source.

2. Description of Related Art

A backlight source often includes a circuit board and a plurality of light emitting diodes (LEDs) positioned thereon, which are produced by surface mount technology (SMT). During assembly of the backlight source, a robotic arm (not shown) grasps the LED pieces, and positions the LED pieces in a plurality of predetermined regions of the circuit board. However, after the backlight source is assembled, it must be subjected to functional testing. If one or more LEDs on the circuit board remain to be unlit during testing, the backlight source must be reassembled. Thus, an assembly efficiency of the backlight source is reduced. In addition, the robotic arm can only grasp one LED piece at a time, thereby decreasing the assembly efficiency.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

FIGS. 5 through 9 are a plurality of schematic views showing the transferring of light emitting diodes on a support assembly, and adhering of the light emitting diodes to a circuit board by an attachment mechanism.

DETAILED DESCRIPTION

Figure 1:
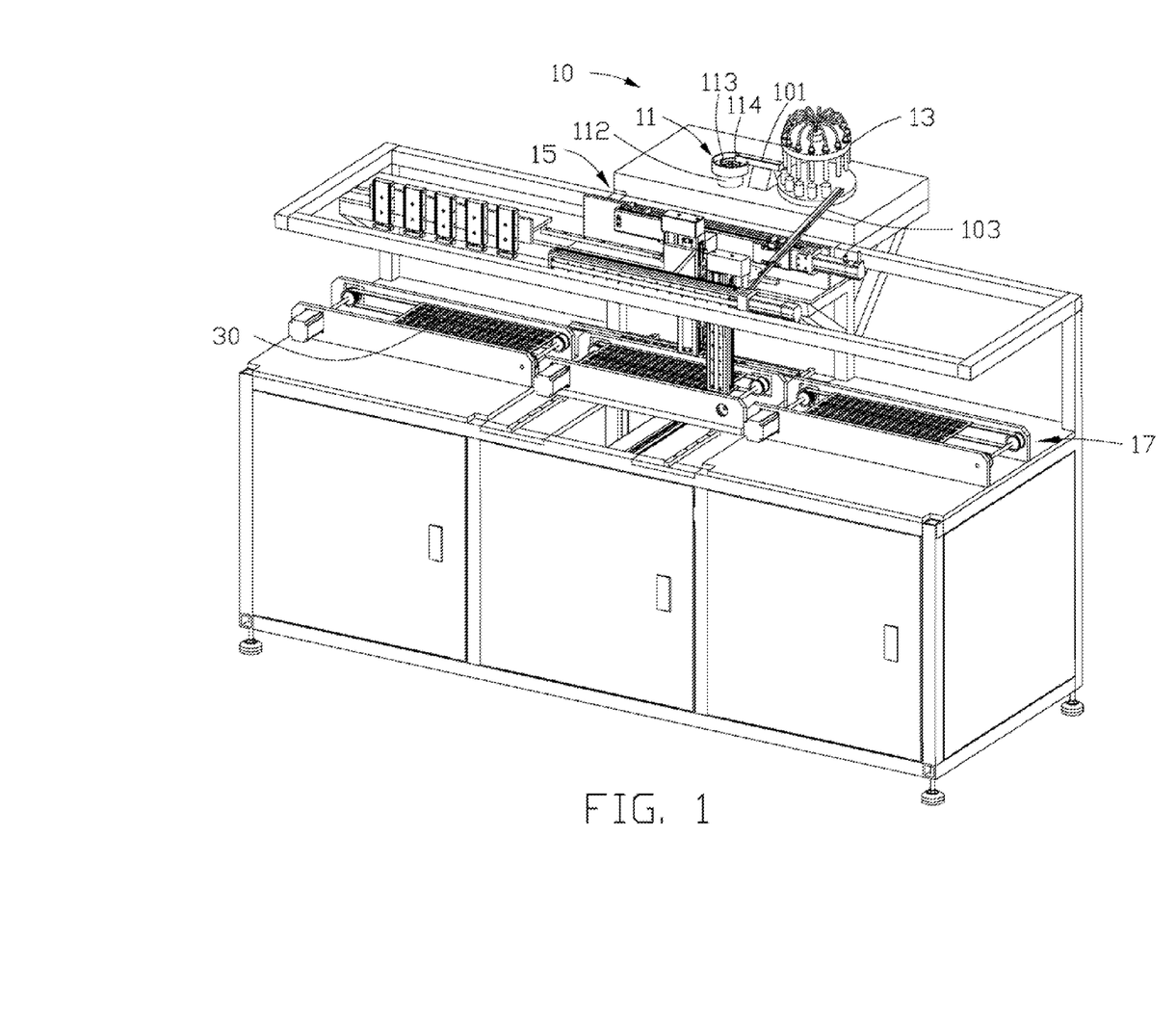
FIG. 1 is an isometric view of an embodiment of an manufacturing apparatus for a backlight unit, including a feed mechanism, a testing mechanism, an attachment mechanism, and a transport mechanism.

Referring to FIG. 1, an embodiment of a manufacturing apparatus 10 for manufacturing a backlight unit 30 includes a feed mechanism 11, a testing mechanism 13, an attachment mechanism 15, and a transport mechanism 17. In the illustrated embodiment, the backlight unit 30 includes a circuit board 31 and a plurality of light emitting diodes 32 arranged thereon in rows (see FIG. 4). The feed mechanism 11 transfers the light emitting diodes 32 to the testing mechanism 13. The testing mechanism 13 tests the light emitting diodes 32, and delivers the light emitting diodes 32 which have passed the testing requirements to the attachment mechanism 15. The transport mechanism 17 carries the circuit board 31 to the attachment mechanism 15. The attachment mechanism 15 attaches the light emitting diodes 32 to the circuit board 31.

The feed mechanism 11 includes a vibration plate (not labeled). The vibration plate includes a hopper 112, a spiral track 113 and a discharge port 114. The spiral track 113 is positioned in the hopper 112, and the discharge port 114 is connected to a top end of the spiral track 113. The hopper 112 can vibrate up and down, so that the bulk of electronic components, such as the light-emitting diodes 32 move along the spiral track 113, from low to high, and automatically arrange orientation thereof, until the light-emitting diodes 32 enter into a first feed rail 101. The first feed rail 101 transfers the light-emitting diodes 32 in turns to the testing mechanism 13.

Figure 2:
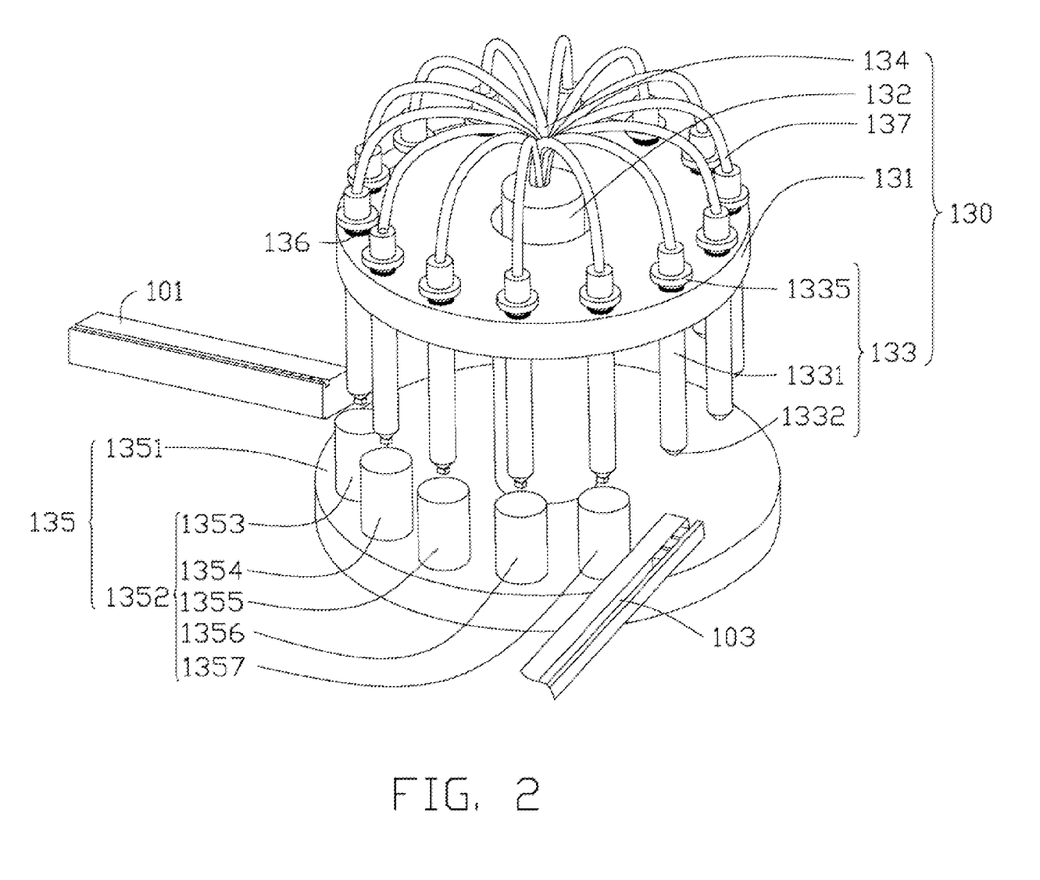
FIG. 2 is an isometric view of the testing mechanism of the manufacturing apparatus of FIG. 1.

Referring to FIG. 2, the testing mechanism 13 is configured to determine whether the parameters of the light-emitting diodes 32, such as the type and electric potential, can properly meet the product specifications and functional requirements. The testing mechanism 13 includes a rotatable platform 130 and a testing board 135 opposite to the rotatable platform 130. The rotatable platform 130 tests the sizes of the light-emitting diodes 32 transferred by the first feed rail 101, and determines whether the light-emitting diodes 32 can be lit. After testing, the light-emitting diodes 32 meeting the specifications or requirements are transferred to the attachment mechanism 15 by a second feed rail 103.

The rotatable platform 130 includes a circular main body 131, a rotatable shaft 132, a plurality of suction members 133, a plurality of brake members 134, and a plurality of vacuum conduits 137. The main body 131 is rotatably positioned on the rotatable shaft 132. The suction members 133 are partially received in the main body 131. The brake members 134 are received in the rotatable shaft 132. The vacuum conduits 137 connect the suction members 133 to the brake members 134 respectively. Each suction member 133 includes a cylindrical main shaft 1331, a suction head 1332, and a restricting member 1335. An end of the main shaft 1331 is connected to the vacuum conduit 137, and the other end of the main shaft 1331 is connected to the suction head 1332. The restricting member 1335 is sleeved on the main shaft 1331, at adjacent to the vacuum conduit 137. In the illustrated embodiment, the restricting member 1335 is hollow and cylindrical, and coaxial with the main shaft 1331.

The main body 131 defines a plurality of assembly holes 136 evenly arranged in a periphery of the main body 131. The main shafts 1331 of the suction members 133 extend through the assembly holes 136, until the restricting members 1335 of the suction members 133 attach to the main body 131. A cushion member (not shown), such as a spring, may be positioned between the restricting members 1335 and the main body 131, to avoid the restricting members 1335 from directly colliding with the main body 131.

The testing board 135 includes a base 1351, a testing module, and a disposal module, wherein the testing module and the disposal module are referred as the testing units 1352. The testing units 1352 are positioned on the base 1351. The base 1351 is parallel to the main body 131, with the testing units 1352 arranged corresponding to the suction heads 1332. The testing units 1352 include a size testing unit 1353, a first discharge unit 1354, a first function testing unit 1355, a second function testing unit 1356, and a second discharge unit 1357. Specifically, the testing module has the size testing unit 1353, the first function testing unit 1355, and the second function testing unit 1356; and the disposal module has the first discharge unit 1354 and the second discharge unit 1357. The size testing unit 1353 tests a size of each light-emitting diode 32, and determines whether the size thereof comforms or corresponds with a predetermined size. If the size of the light-emitting diode 32 does not correspond or conforms to the predetermined size, the light-emitting diode 32 is recycled by the first discharge unit 1354. If the size of the light-emitting diode 32 corresponds to the predetermined size, the light-emitting diode 32 is suctioned by the suction head 1332, and transferred to the first function testing unit 1355. After that, the light-emitting diode 32 is tested by the first function testing unit 1355, and the second function testing unit 1356. A testing electric potential of the first function testing unit 1355 and the second function testing unit 1356 is contrary to one another. Thus, if the light-emitting diode 32 can be lit on one of the first function testing unit 1355 and the second function testing unit 1356, the light-emitting diode 32 is transferred to the attachment mechanism 15 by the second feed rail 103. If the light-emitting diode 32 cannot be lit on both of the first function testing unit 1355 and the second function testing unit 1356, the light-emitting diode is recycled by the second discharge unit 1357. Therefore, the unqualified or defective light-emitting diodes 32 are recycled by the first discharge unit 1354 and the second discharge unit 1357. In the illustrated embodiment, the size testing unit 1353 can be a charge coupled device (CCD), which can capture a plurality of images of the light-emitting diodes 32 to determine whether or not the sizes of light-emitting diodes 32 correspond to the predetermined sizes. It should be appreciated that the testing mechanism 13 may include other testing units 1352 for testing other functional parameters, such as resistance.

Figure 3:
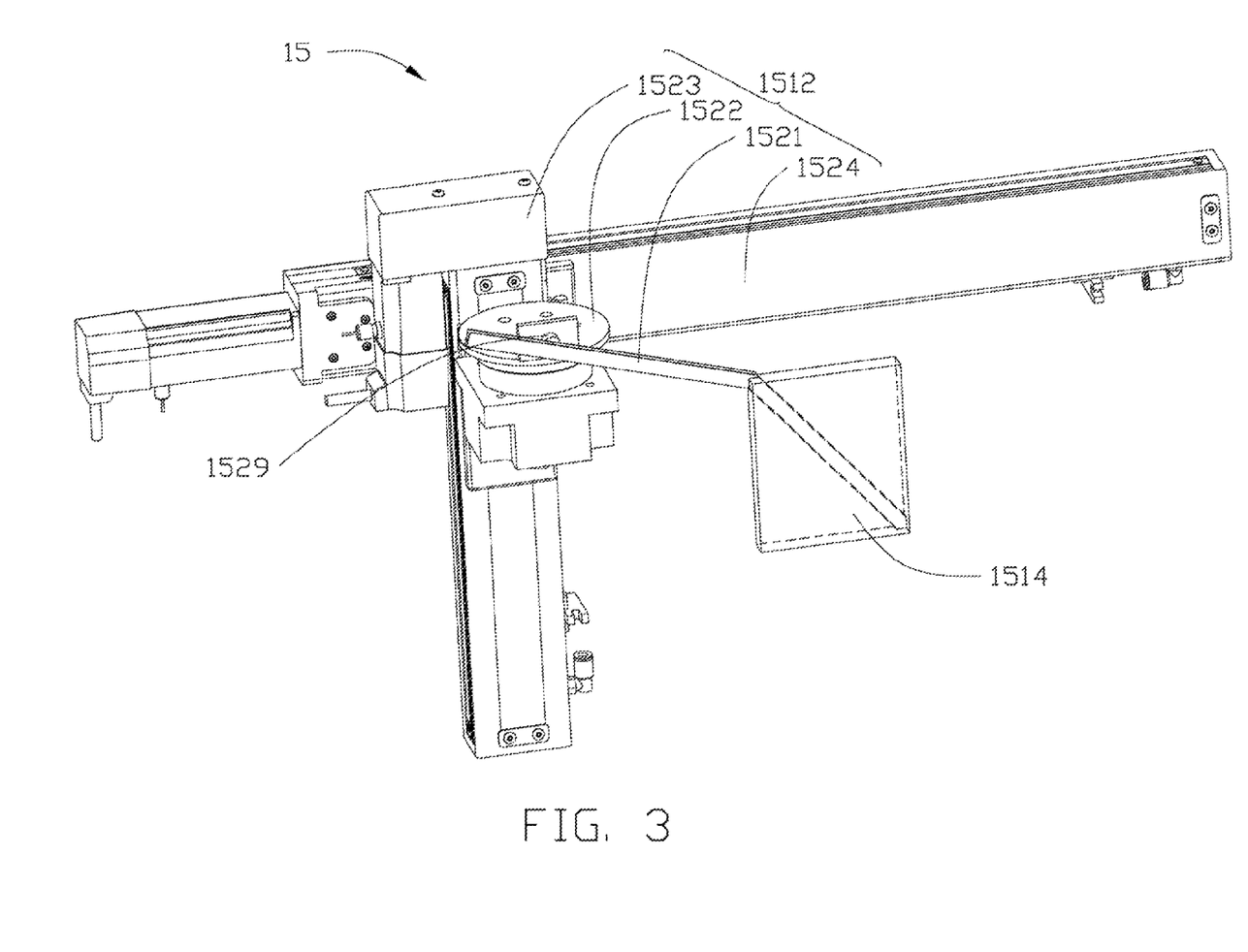
FIG. 3 is an isometric view of one part of attachment mechanism of the manufacturing apparatus of FIG. 1.
Figure 4:
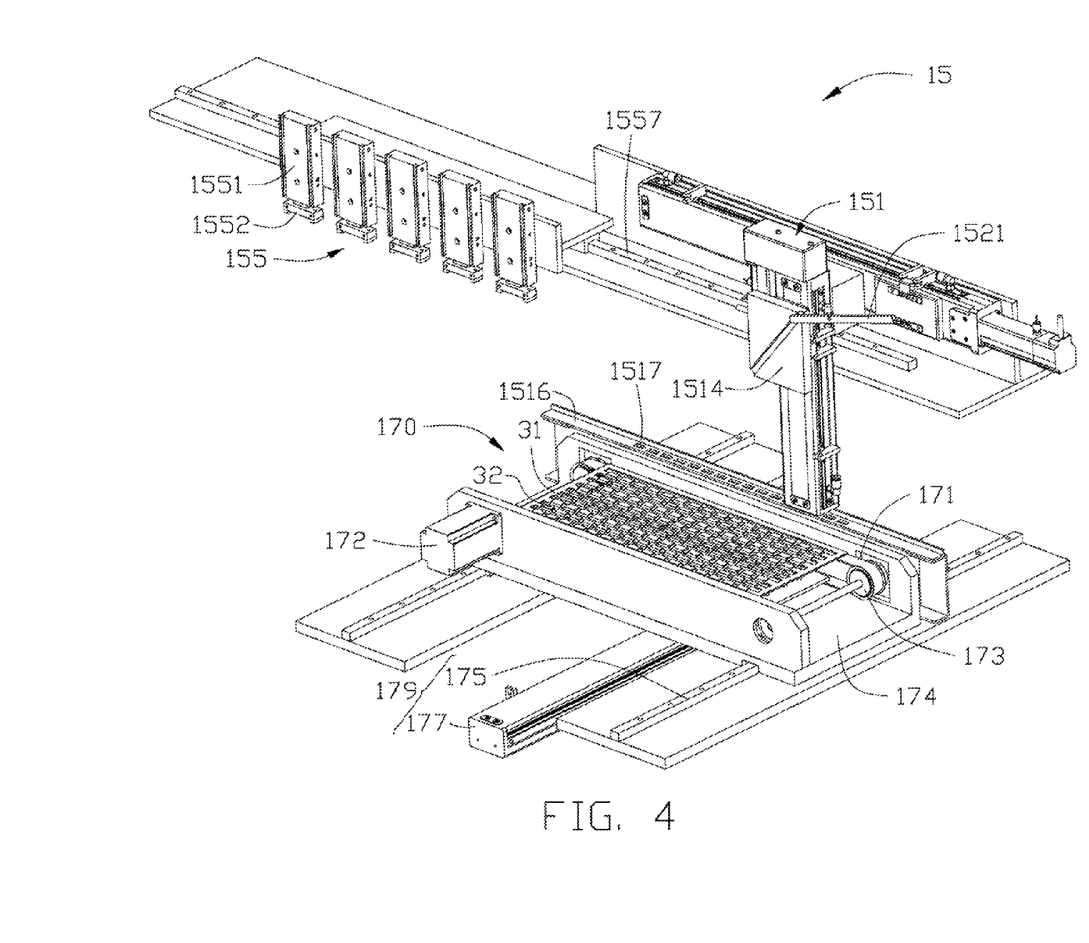
FIG. 4 is an isometric view of the other part of attachment mechanism of the manufacturing apparatus of FIG. 1.

Referring to FIGS. 3 and 4, the attachment mechanism 15 includes an automatic guiding feeder 151 and a fixing device (hereafter referred as the laminating device 155). The automatic guiding feeder 151 is configured to receive the light-emitting diodes 32 transferred from the testing mechanism 13, and position the light-emitting diodes 32 in a circuit board 31 being spread with solder paste. The laminating device 155 is configured to laminate the light-emitting diodes 32 to the circuit board 31.

The automatic guiding feeder 151 includes a transferring assembly 1512, a guiding assembly 1514, and a support assembly 1516. The transferring assembly 1512 transfers the light-emitting diodes 32 from the testing mechanism 13 to the guiding assembly 1514, and then the guiding assembly 1514 transfers the light-emitting diodes 32 to the support assembly 1516. The transferring assembly 1512 includes a transfer rail 1521, a transfer tray 1522, a motor 1523, and a cross rail 1524. An end of the transfer rail 1521 is positioned at an edge of the transfer tray 1522. The transfer tray 1522 and the motor 1523 are positioned on the cross rail 1524, and the transfer tray 1522 can move up and down and rotate relative to the cross rail 1524, when driven by the motor 1523. In the illustrated embodiment, the transfer rail 1521 is connected to the transfer tray 1522 via a rotatable shaft 1529, whereby the transfer rail 1521 can rotate relative to the transfer tray 1522. The transfer rail 1521 connects to the guiding assembly 1514 via the rotation of the transfer rail 1521 and the transfer tray 1522. The guiding assembly 1514 transfers the light-emitting diodes 32 one by one from the transfer rail 1521 to the support assembly 1516. The support assembly 1516 defines a plurality of receiving grooves 1517 for receiving the light-emitting diodes 32 inputted from the guiding assembly 1514.

The laminating device 155 is slidably positioned on a guide rail 1557, and includes a plurality of air cylinders 1551 and a plurality of laminating members 1552 connected to one end of the air cylinders 1551 respectively. The laminating device 155 can slide above the light-emitting diodes 32 received in the receiving grooves 1517 of the support assembly 1516, and laminate the light-emitting diodes 32 to the circuit board 31 being spread with solder paste.

The transport mechanism 17 includes a plurality of carrying units 170 and a guiding assembly 179. Each carrying unit 170 includes a main body 174, two guide belts 171, a driving motor 172, and two guide shafts 173. The guide shafts 173 are rotated by the driving motor 172. The guide shafts 173 are parallel and arranged on the main body 174. The guide belts 171 are sleeved on the guide shafts 173. The circuit board 31 is positioned on the guide belts 171, and driven by the guide belts 171. The guiding assembly 179 includes a guide rail 175 and a servo motor 177. The carrying unit 170 is positioned on the guide rail 175. The carrying unit 170 can be transferred to the support assembly 1516, with the light-emitting diodes 32 received in the receiving grooves 1517 opposite to the circuit board 31 on the carrying unit 170. The laminating device 155 laminates the light-emitting diodes 32 on the circuit board 31.

Referring to FIGS. 1 through 5, a manufacturing method of the backlight unit 30 is described as follow.

Figure 5:
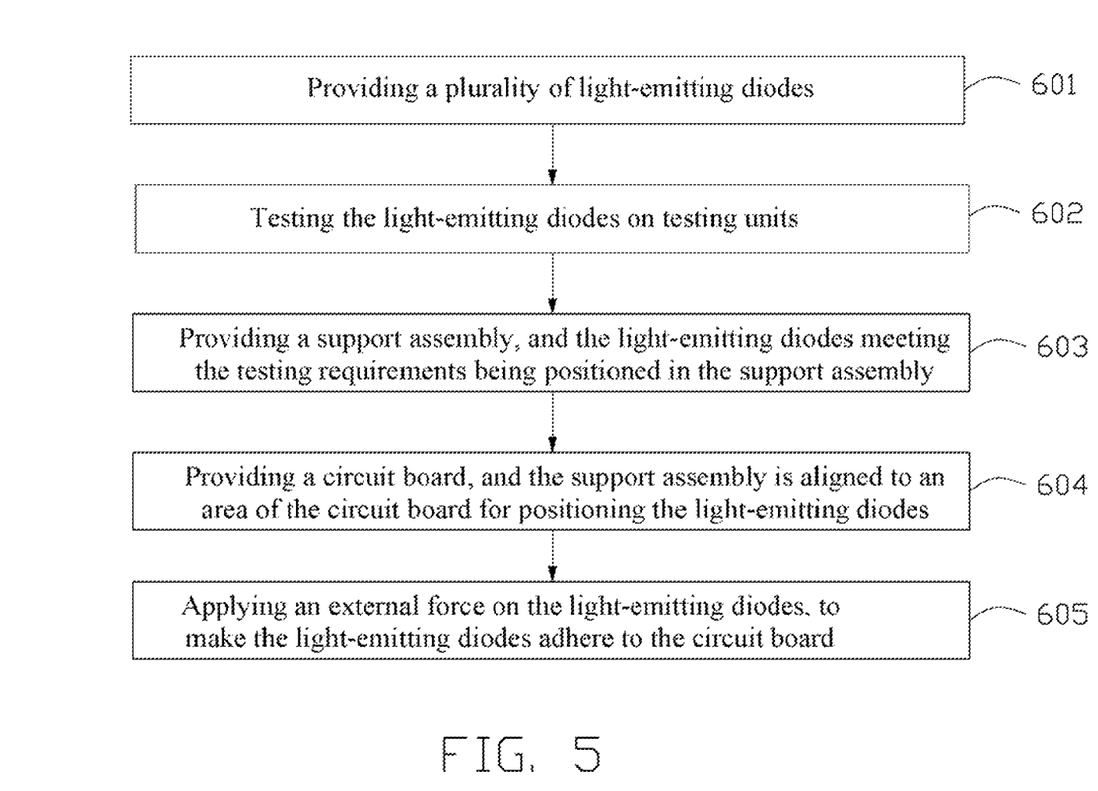
FIG. 5 is a flowchart of an embodiment of manufacturing a backlight unit.
Figure 6:
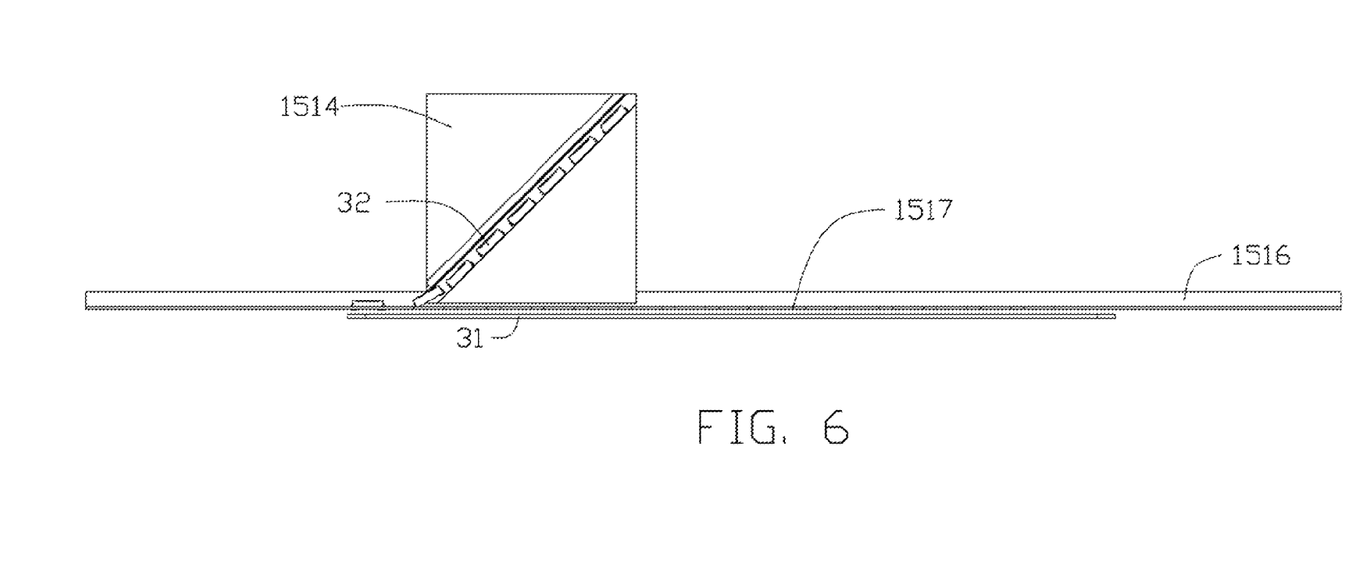
Figure 7:
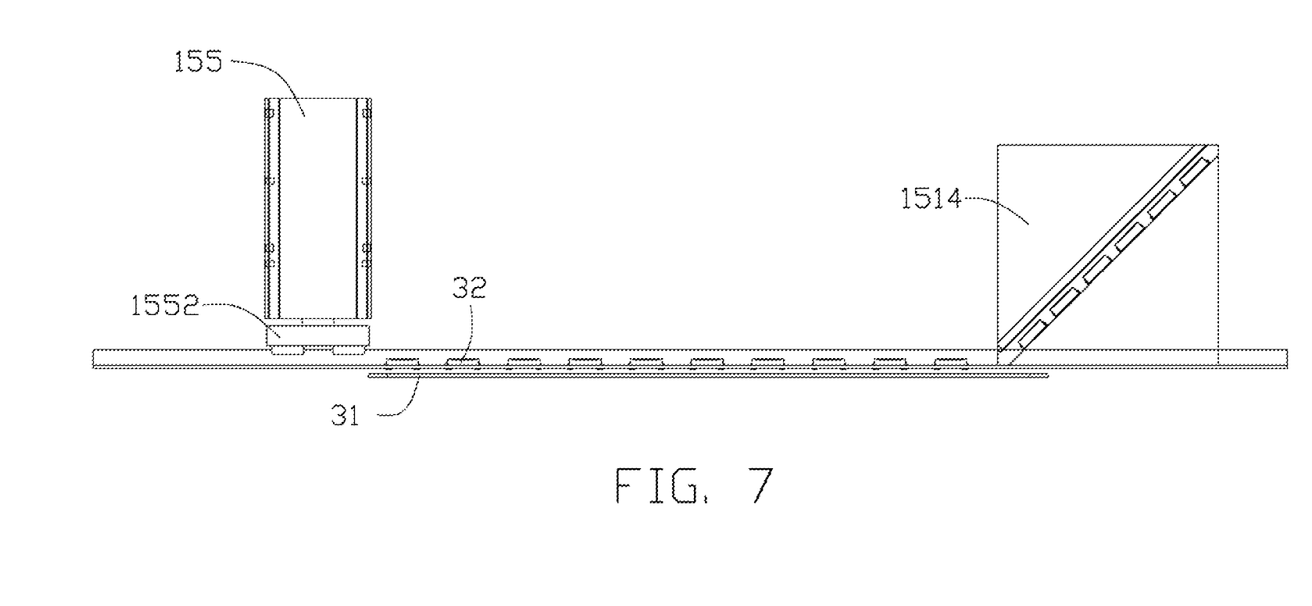
Figure 8:
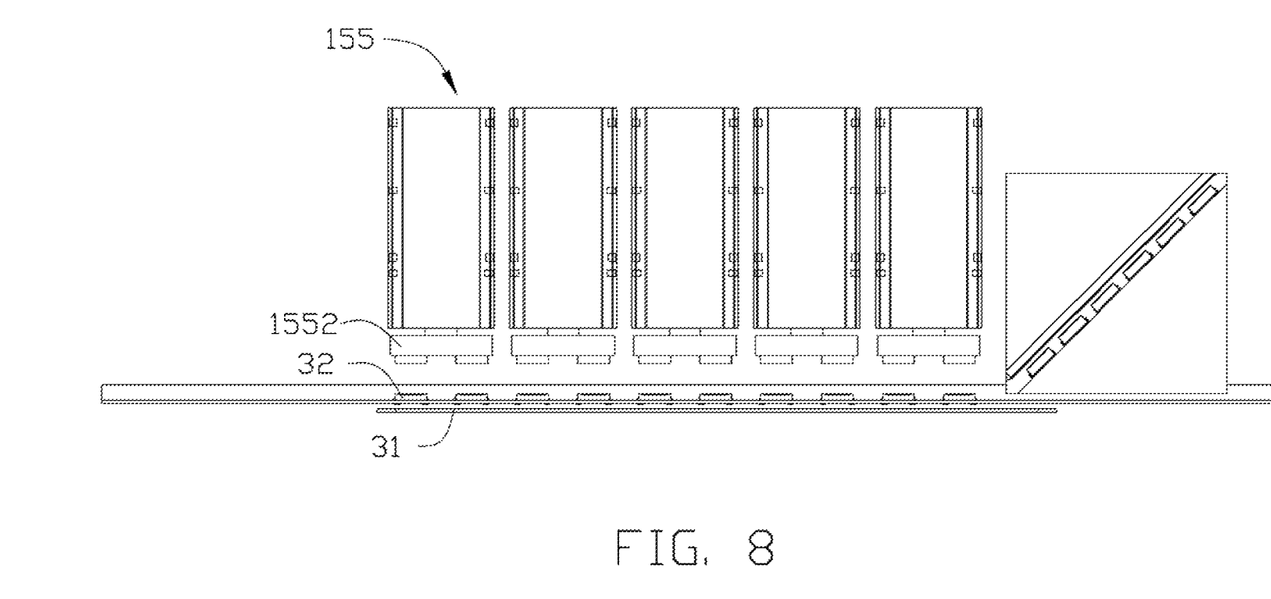
Figure 9:
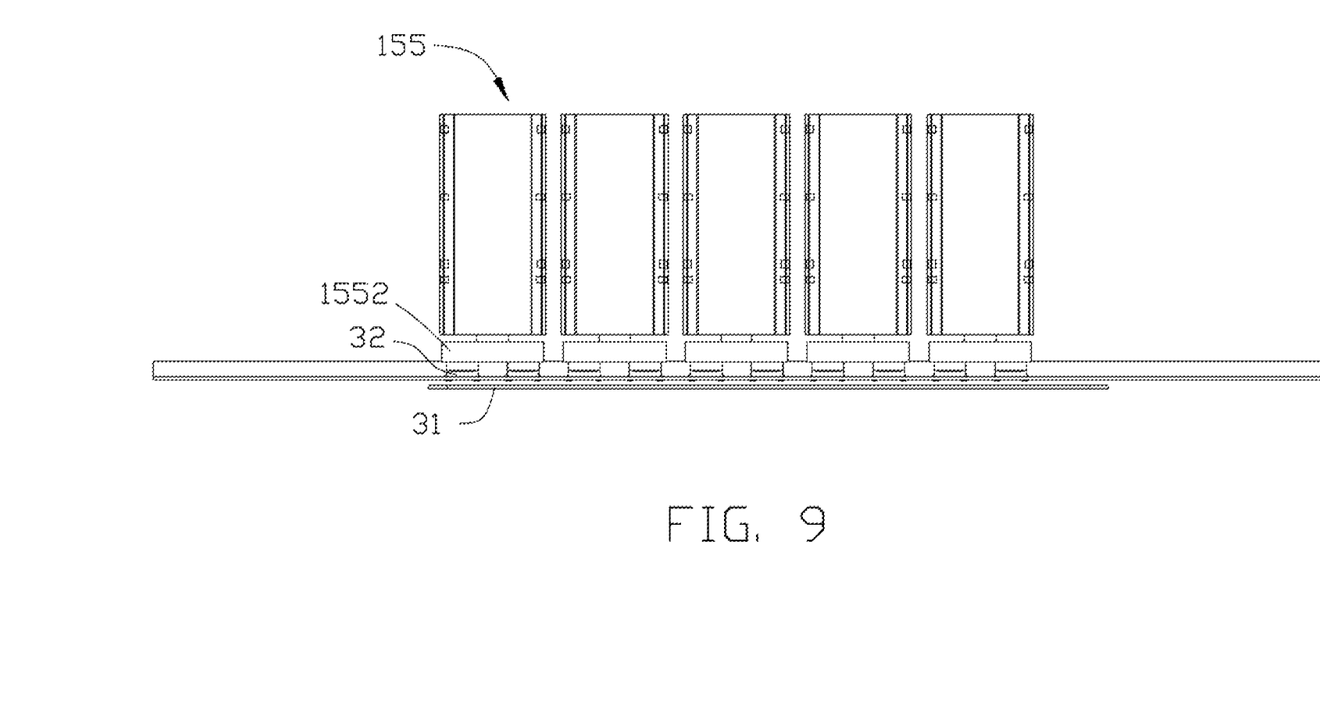

In a first step 601, a plurality of light-emitting diodes 32 are provided. In the illustrated embodiment, the light-emitting diodes 32 are arranged in a row by means of the vibration of the vibration plate, and are transferred to the testing mechanism 13 by the first feed rail 101.

In a second step 602, the light-emitting diodes 32 are tested. In the illustrated embodiment, the testing mechanism 13 tests the light-emitting diodes 32, and provides the light emitting diodes 32 that have passed the testing requirements to the attachment mechanism 15. In detail, the light-emitting diodes 32 on the first feed rail 101 are suctioned by the suction heads 1332 of the suction members 133, and rotated to the size testing unit 1353. The size testing unit 1353 measures each light-emitting diode 32, and determines whether the size thereof comforms, matches with, or corresponds with a predetermined size. If the size of the light-emitting diode 32 does not correspond to the predetermined size, the light-emitting diode 32 is suctioned by the suction heads 1332, and the main body 131 is rotated to position the light-emitting diode 32 to the first discharge unit 1354. If the size of the light-emitting diode 32 corresponds to the predetermined size, the light-emitting diode 32 is suctioned by the suction head 1332, and the main body 131 is rotated to transfer the light-emitting diode 32 to the first function testing unit 1355. After that, the light-emitting diode 32 is tested by the first function testing unit 1355. If the light-emitting diode 32 can be lit on the first function testing unit 1355, the light-emitting diode 32 is suctioned by the suction heads 1332, and transferred to the second feed rail 103. If the light-emitting diode 32 cannot be lit on the first function testing unit 1355, the first function testing unit 1355 first rotates through 180° to change an orientation of the light-emitting diode 32, and the light-emitting diode 32 is suctioned by the suction heads 1332, and transferred to the second function testing unit 1356 for performing another functional testing. If the light-emitting diode 32 can be lit on the second function testing unit 1356, the light-emitting diode 32 is also transferred to the second feed rail 103. If the light-emitting diode 32 cannot be lit on the second function testing unit 1356, the light-emitting diode 32 is suctioned by the suction heads 1332, and transferred to the second discharge unit 1357.

In a third step 603, the support assembly 1516 is provided, and the light-emitting diodes 32 meeting or passing the testing requirements are positioned in the support assembly 1516. In the illustrated embodiment, the transfer rail 1521 is connected to the second feed rail 103, and transfers the light-emitting diodes 32 which have met testing requirements to the guiding assembly 1514. The guiding assembly 1514 positions the light-emitting diodes 32 on the support assembly 1516.

In a fourth step 604, a circuit board 31 is provided, and the support assembly 1516 is aligned to an area of the circuit board 31 for positioning the light-emitting diodes 32. The area of the circuit board 31 for positioning the light-emitting diodes 32 is applied with solder paste. Referring to FIGS. 6 through 9, in the illustrated embodiment, the guiding assembly 1514 positions the light-emitting diodes 32 on the support assembly 1516, and each light-emitting diode 32 is received in one corresponding receiving groove 1517 of the support assembly 1516 in a row, respectively.

In a fifth step 605, an external force is applied on the light-emitting diodes 32, to make the light-emitting diodes 32 adhere to the circuit board 31. The laminating members 1552 of the laminating device 155 apply an external force on the light-emitting diodes 32, to receive the light-emitting diodes 32 in the receiving grooves 1517 adhering to the area of the circuit board 31 covered with solder paste.

The circuit board 31 is moved by the guide rail 175 and the servo motor 177, thereby adhering other rows of the light-emitting diodes 32 on the circuit board 31.

The manufacturing apparatus 10 for the backlight unit 30 can adhere a plurality of light-emitting diodes 32 on the circuit board 31 each time, thereby enhancing the manufacturing efficiency of the backlight unit 30. In addition, each light-emitting diode 32 positioned on the circuit board 31 is pretested, thus eliminating any requirement to remake the backlight unit 30.

It is believed that the present embodiments and their advantages can be understood from the foregoing description, and it is apparent that various changes may be made thereto without departing from the spirit and scope of the disclosure or sacrificing all of its material advantages.

What is claimed is:

1. A manufacturing apparatus for manufacturing a backlight unit, comprising:
   a feed mechanism configured to arrange a plurality of light-emitting diodes in a row;
   a testing mechanism having a testing module and a disposal module, wherein the testing module is configured to test the function of the light-emitting diodes, wherein the disposal module is configured to discharge the light-emitting diodes that do not pass the test of the test module;
   a first feed rail connecting the feed mechanism and the testing mechanism, wherein the first feed rail is configured to transfer the light-emitting diodes from the feed mechanism to the testing mechanism;
   an attachment mechanism having a guiding feeder and a fixing device; and
   a second feed rail connecting the testing mechanism and the attachment mechanism, wherein the second feed rail is configured to transfer the light-emitting diodes, that passed the test of the test module, from the testing mechanism to the guiding feeder,
   wherein the guiding feeder is configured to arrange the light-emitting diodes, that passed the test of the test module, to align a circuit board, and wherein the fixing device is configured to bond the light-emitting diodes, that passed the test of the test module, to the circuit board.

2. The manufacturing apparatus of claim 1, further comprising a transport mechanism arranged under the guiding feeder for moving the circuit board.

3. The manufacturing apparatus of claim 1, wherein the feed mechanism comprises a hopper, a spiral track, and a discharge port, the spiral track is positioned in the hopper, and the discharge port is connected to a top end of the spiral track, and wherein the hopper is configured to vibrate the light-emitting diodes for moving the light-emitting diodes along the spiral track into the first feed rail via the discharge port.

4. The manufacturing apparatus of claim 1, wherein the testing mechanism comprises a rotatable platform and a testing board having the testing module and the disposal module, and the testing board is opposite to the rotatable platform, and wherein the rotatable platform is configured to transfer the light-emitting diodes from the first feed rail to the second feed rail or the disposal module.

5. The manufacturing apparatus of claim 4, wherein the rotatable platform comprises a main body and a plurality of suction members positioned on the main body, and wherein the main body is configured to rotate the suction members for transferring the light-emitting diodes from the first feed rail to the second feed rail or the disposal module by the suction members in turn.

6. The manufacturing apparatus of claim 5, wherein the testing board includes a base parallel to the main body, and the testing module and the disposal module are positioned on the base.

7. The manufacturing apparatus of claim 6, wherein the testing module comprises a size testing unit, a first function testing unit, and a second function testing unit, wherein the disposal module comprises a first discharge unit and a second discharge unit, and wherein the size testing unit, the first discharge unit, the first function testing unit, the second function testing unit, and the second discharge unit are arranged in turns at a periphery of the base.

8. The manufacturing apparatus of claim 1, wherein the guiding feeder has a plurality of receiving grooves for receiving the light-emitting diodes.

9. The manufacturing apparatus of claim 1, wherein the fixing device comprises a plurality of air cylinders and a plurality of laminating members connected to the air cylinders.

* * * * *